United States Patent
Chen

(10) Patent No.: US 7,724,313 B2
(45) Date of Patent: May 25, 2010

(54) AUTOMATIC DUST-REMOVING DEVICE FOR A LIQUID CRYSTAL PANEL AND PROJECTOR USING THE SAME

(75) Inventor: Yung-Hsiang Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 89 days.

(21) Appl. No.: 12/102,633

(22) Filed: Apr. 14, 2008

(65) Prior Publication Data

US 2009/0109354 A1 Apr. 30, 2009

(30) Foreign Application Priority Data

Oct. 30, 2007 (CN) .................... 2007 1 0202309

(51) Int. Cl.
*G02F 1/1335* (2006.01)
*G02F 1/1333* (2006.01)

(52) U.S. Cl. ............... 349/5; 349/8; 349/58; 15/347; 310/311

(58) Field of Classification Search ............ 349/8
See application file for complete search history.

(56) References Cited

U.S. PATENT DOCUMENTS

2005/0088563 A1* 4/2005 Ito et al. .................. 348/335
2006/0146298 A1* 7/2006 Lin ......................... 353/101

* cited by examiner

*Primary Examiner*—Andrew Schechter
*Assistant Examiner*—Dennis Y Kim
(74) *Attorney, Agent, or Firm*—Andrew C. Cheng

(57) ABSTRACT

A projector (100) includes a light source unit (20), a light polarizing module (11), a color light separation optical module (12), a reflection mirror group (13), a liquid crystal panel group (17), a cross dichroic prism (18), a projection lens (19), and two automatic dust-removing devices (16) for removing dust from the liquid crystal panel group. The liquid crystal panel group includes three liquid crystal panels (171, 172, 173). Each of the liquid crystal panels includes a mounting frame (179) and a liquid crystal lens (178) attached to the mounting frame. The automatic dust-removing devices are attached to opposite sides of the mounting frames. Each of the automatic dust-removing devices includes a fastening element (161), two vibration elements (163) and an optical lens (164). The fastening element is attached to the mounting frame. The vibration elements and the optical lens are attached to the fastening element.

13 Claims, 3 Drawing Sheets

AUTOMATIC DUST-REMOVING DEVICE FOR A LIQUID CRYSTAL PANEL AND PROJECTOR USING THE SAME

BACKGROUND

1. Technical Field

The present invention generally relates to liquid crystal panels, and more particularly to an automatic dust-removing device for a liquid crystal panel and a projector using the same.

2. Description of Related Art

A projector usually includes an enclosure, a plurality of elements disposed in the enclosure, such as a light source, three liquid crystal panels, a cross dichroic prism, and a projection lens.

In the projector, a heat dissipation system is needed for dissipating heat generated during the operation of the projector. However, external dust will enter into the projector along air vents of the enclosure and attach to liquid crystal lenses of the liquid crystal panels. This causes dust spots to appear in the image projected by the projector and decreases the quality of the image. Thus, there is a need for an automatic dust-removing device for removing dust from the liquid crystal panel of a projector.

SUMMARY

The present invention provides a liquid crystal panel. The liquid crystal panel includes a mounting frame, a liquid crystal lens attached to the mounting frame, and two automatic dust-removing devices attached to opposite sides of the mounting frame respectively. Each of the automatic dust-removing devices includes a fastening element, two vibration elements, and an optical lens. The fastening element is attached to the mounting frame. The vibration elements and the optical lens are attached to the fastening element. The present invention also provides a projector using the liquid crystal panel.

Other advantages and novel features of the present liquid crystal panel and projector will become more apparent from the following detailed description of preferred embodiments when taken in conjunction with the accompanying drawings.

DETAILED DESCRIPTION

Figure 1:
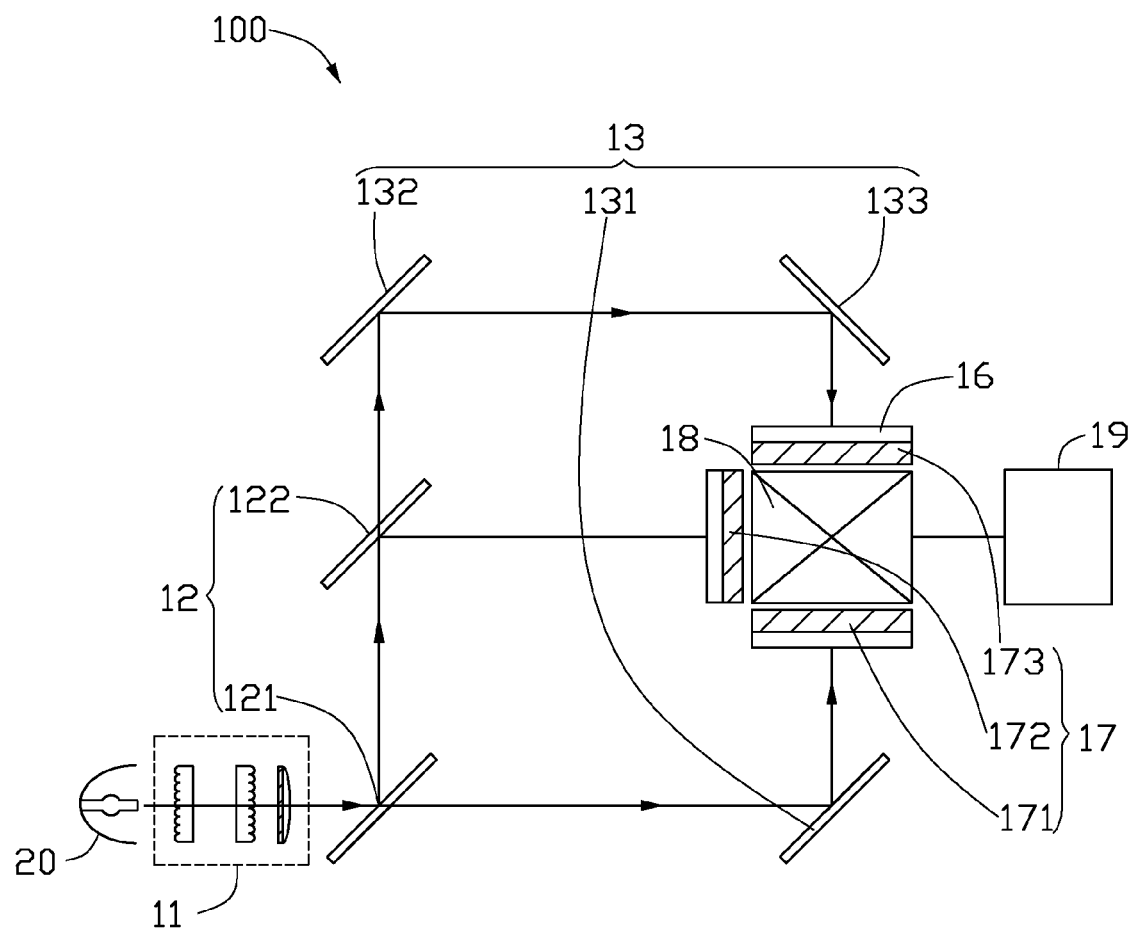
FIG. 1 is a schematic view of a projector according to an exemplary embodiment of the present invention.

Reference will now be made to the drawing figures to describe the exemplary embodiment in detail.

Referring to FIG. 1, a projector 100 according to an exemplary embodiment of the present invention is shown. The projector 100 includes a light source unit 20, a light polarizing module 11, a color light separation optical module 12, three automatic dust-removing devices 16, a liquid crystal panel group 17, a reflection mirror group 13, a cross dichroic prism 18, and a projection lens 19.

The light polarizing module 11 faces the light source unit 20. The color light separation optical module 12 includes a first dichroic mirror 121 and a second dichroic mirror 122. The liquid crystal panel group 17 includes a first liquid crystal panel 171, a second liquid crystal panel 172, and a third liquid crystal panel 173. The reflection mirror group 13 includes a first reflection mirror 131, a second reflection mirror 132, and a third reflection mirror 133. The cross dichroic prism 18 includes three light incident surfaces and a light emitting surface. Each of the light incident surfaces of the cross dichroic prism 18 faces and spaces a distance from a corresponding liquid crystal panel 171, 172, 173. The light emitting surface of the cross dichroic prism 18 faces the projection lens 19.

In operation of the projector 100, light emitted from the light source unit 20 evenly transmits through the light polarizing module 11 and is separated into P-polarized light and S-polarized light. The light is then separated into three colored lights red (R), green (G) and blue (B) at the color light separation optical module 12. The first dichroic mirror 121 reflects B light and G light and allows R light to transmit through. The second dichroic mirror 122 reflects G light and allows B light to transmit through. The R light transmitted through the first dichroic mirror 121 is made incident upon the first liquid crystal panel 171 by the first reflection mirror 131. The G light reflected by the first dichroic mirror 121 is made incident upon the second liquid crystal panel 172 by the second dichroic mirror 122. The B light transmitted through the first and the second dichroic mirrors 121, 122 is made incident upon the third liquid crystal panel 173 by the second and the third reflection mirrors 132, 133. The cross dichroic prism 18 combines the R, G, and B lights from the liquid crystal panel group 17 together. The projection lens 19 projects the combined light on a screen (not shown) of the projector 100 to form a visible colored image.

The automatic dust-removing devices 16 are disposed on the liquid crystal panels 171, 172, 173 of the liquid crystal panel group 17, respectively, for preventing external dust from attaching to the liquid crystal panels 171, 172, 173.

Figure 2:
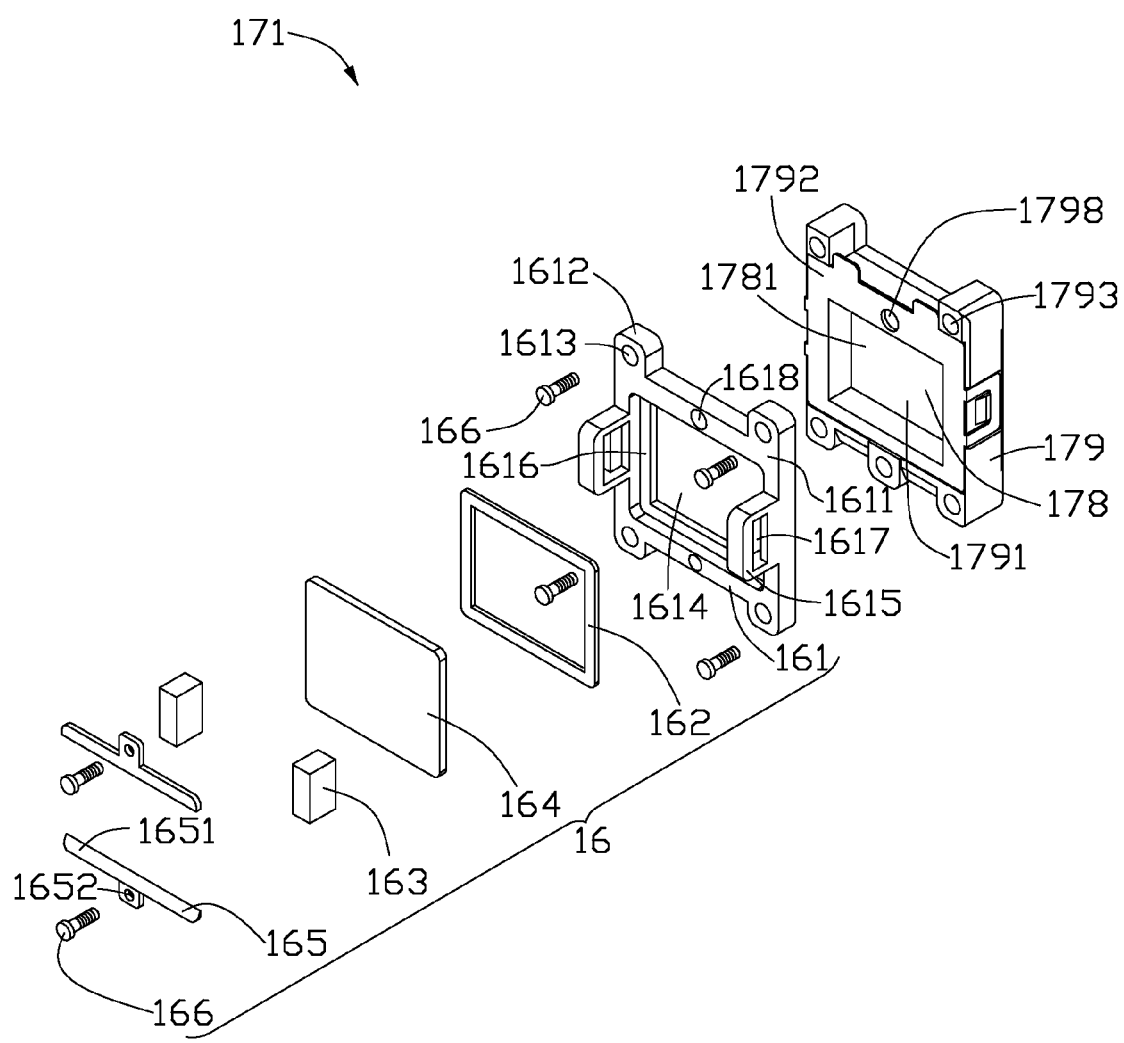
FIG. 2 is an exploded, isometric view of an automatic dust-removing device together with a corresponding liquid crystal panel of the projector of FIG. 1.

Each of the liquid crystal panel 171, 172, 173 includes a liquid crystal lens 178 and a mounting frame 179 to which the liquid crystal lens 178 is mounted, as can be seen in FIG. 2 where the liquid crystal panel 171 is shown as an example.

The liquid crystal lens 178 is rectangular shaped in profile, and includes a first surface 1781 and an opposite second surface (not shown) configured to face a corresponding light incident surface of the cross dichroic prism 18. The automatic dust-removing device 16 is arranged at the first surface 1781 of the liquid crystal lens 178, for removing external dust from the first surface 1781 of the liquid crystal lens 178. Alternatively, two automatic dust-removing devices 16 may be arranged at both the first surface 1781 and the second surface of the liquid crystal lens 178.

The mounting frame 179 includes a rectangular main body 1792 and a receiving cavity 1791 defined in a middle portion of the main body 1792. The liquid crystal lens 178 is received in the receiving cavity 1791 of the mounting frame 179. The main body 1792 of the mounting frame 179 defines four first threaded holes 1793 at four corners thereof respectively. Two opposite sides (not labeled) of the main body 1792 each define a second threaded hole 1798 at a middle portion thereof.

Figure 3:
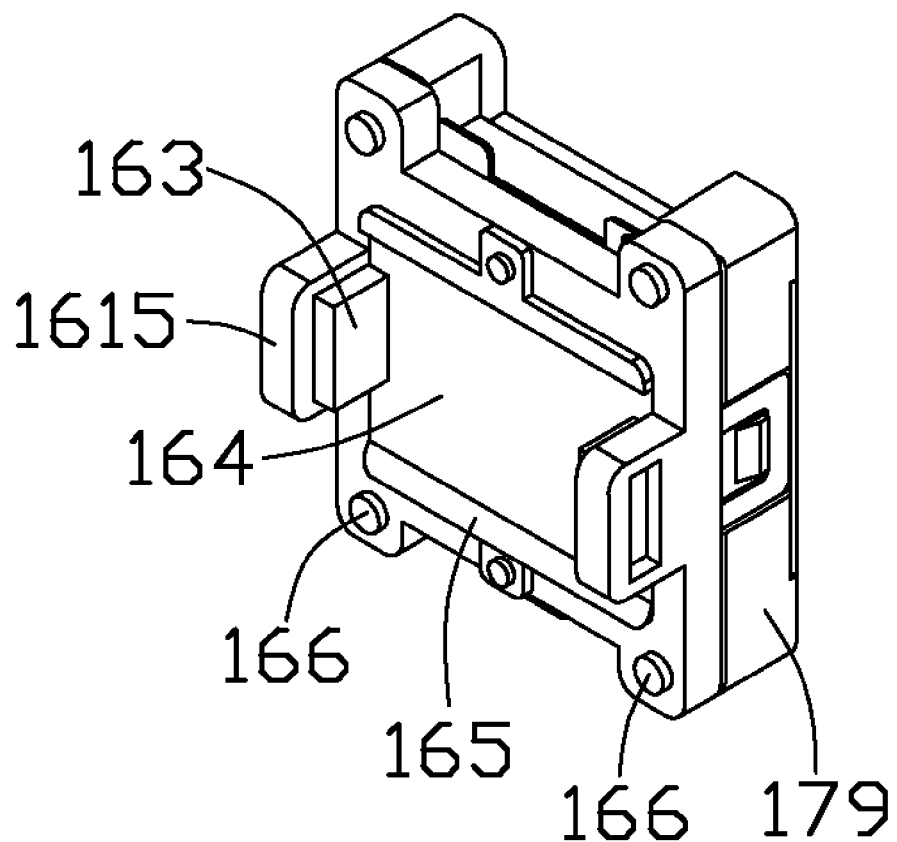
FIG. 3 is an assembled view of FIG. 2.

Referring to FIGS. 2 and 3, the automatic dust-removing device 16 is attached to the main body 1792 of the mounting frame 179. The automatic dust-removing device 16 includes a fastening element 161, an adhesive element 162, an optical lens 164, two vibration elements 163, an urging element 165, and six screws 166.

The fastening element 161 has a substantially similar periphery as the main body 1792 of the mounting frame 179 and includes a side facing away from the mounting frame 179. A rectangular shaped through opening 1614 is defined in the side of the fastening element 161. Extending in from center of sides bounding the opening 1614 is a supporting surface 1616.

Two opposite ribs 1611 of the fastening element 161 each have two bulges 1612 at opposite ends thereof. The bulges 1612 of the fastening element 161 each define a first through hole 1613 therein. The first through holes 1613 of the fastening element 161 align with the first threaded holes 1793 of the mounting frame 179, respectively. Four screws 166 extend through the first through holes 1613 of the fastening element 161 and the first threaded holes 1793 of the mounting frame 179, thereby assembling the fastening element 161 and the mounting frame 179 together. The other two opposite ribs 1611 of the fastening element 161 each define a second through hole 1618 at a middle portion thereof. The second through holes 1618 of the fastening element 161 align with the second threaded holes 1798 of the mounting frame 179, respectively.

The fastening element 161 further includes two handles 1615 which vertically extend from the two opposite ribs 1611 of the fastening element 161 and are perpendicular to the other two opposite ribs 1611 of the fastening element 161. Each handle 1615 of the fastening element 161 defines a receiving hole 1617 at a middle portion thereof. The vibration elements 163 are engagingly received in the receiving holes 1617 of the fastening element 161, respectively. The vibration element 163 is selected from a vibration motor, a piezoelectric motor, or a piezoelectric transducer. In the present automatic dust-removing device 16, the vibration element 163 is a piezoelectric transducer, which will not generate noise during operation thereof and is convenient for use in a tiny space.

The adhesive element 162 is rectangular shaped in profile and defines an opening at a middle portion thereof. The adhesive element 162 is selected from double-sided adhesive tape, or silicone adhesive. The adhesive element 162 is placed on the supporting surface 1616 of the fastening element 161 and sandwiched between the optical lens 164 and the fastening element 161.

The optical lens 164 is rectangular shaped in profile. A size of a peripheral edge of the optical lens 164 is substantially equal to that of the adhesive element 162. The optical lens 164 is made of transparent glass, and in this embodiment is BK7 optical glass. The optical lens 164 is placed in the through opening 1614 of the fastening element 161 and is adhered to the fastening element 161 via the adhesive element 162. The optical lens 164 covers the liquid crystal lens 178, preventing the liquid crystal lens 178 from being dirtied by external dust.

The urging element 165 includes two elongated urging strips 1651. Each of the urging strips 1651 defines a mounting hole 1652 at a middle portion thereof. The mounting holes 1652 of the urging element 165 align with the second through holes 1618 of the fastening element 161, respectively. Two screws 166 extend through the mounting holes 1652 of the urging element 165 and the second through holes 1618 of the fastening element 161, thereby assembling the urging element 165 to the fastening element 161. The urging strips 1651 each generate a force exerted toward an edge of the optical lens 164 so that the optical lens 164 has intimate contact with the adhesive element 162 of the automatic dust-removing device 16.

In the operation of the projector 100, the external dust is removed from the optical lens 164 by vibrations generated by the vibration elements 163, which prevents the optical lens 164 from being dirtied by the external dust.

In the present automatic dust-removing device 16, the fastening element 161 and the mounting frame 179 are screwed together. Alternatively, the fastening element 161 and the mounting frame 179 can be bonded together. The vibration elements 163 may also be bonded to the ribs 1611 of the fastening element 161 or the optical lens 164 of the automatic dust-removing device 16. When the fastening element 161 and the vibration elements 163 are bonded to the mounting frame 179 and the fastening element 161 or to the mounting frame 179 and the optical lens 164, respectively, the urging element 165 can be omitted.

In the present automatic dust-removing device 16, the fastening element 161 includes four ribs 1611. Alternatively, the fastening element 161 may merely include two parallel ribs 1611. The two parallel ribs 1611 also enable assembly of the fastening element 161 onto the mounting frame 179 and attaching the optical lens 164 and the vibration elements 163 to the fastening element 161.

It is to be understood, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal panel comprising:
    a mounting frame;
    a liquid crystal lens attached to the mounting frame; and
    at least one automatic dust-removing device attached to at least one side of the mounting frame, each of the at least one automatic dust-removing device including a fastening element, at least one vibration element and an optical lens, the fastening element being attached to the mounting frame, the at least one vibration element and the optical lens being attached to the fastening element, the fastening element comprising at least two sidewalls and at least one handle mounted on each of the at least two sidewalls, the at least two sidewalls being attached to the mounting frame, the at least one vibration element received in one of the at least two handles, the two handles each defining at least one receiving hole for receiving the at least one vibration element therein.

2. The liquid crystal panel of claim 1, wherein the mounting frame comprises a main body and a receiving cavity defined in the main body, the liquid crystal lens being received in the receiving cavity of the mounting frame.

3. The liquid crystal panel of claim 1, wherein the fastening element has an indent defined between at least two sidewalls, a supporting surface being at a bottom of the indent, the optical lens being received in the indent of the fastening element and being disposed on the supporting surface.

4. The liquid crystal panel of claim 1, further comprising an adhesive element for adhering the optical lens to the fastening element.

5. The liquid crystal panel of claim 1, further comprising an urging element, the urging element including at least two urging strips, the at least two urging strips being attached to the fastening element and generating forces exerted toward edges of the optical lens.

6. The liquid crystal panel of claim 1, wherein the at least a vibration element is selected from a vibration motor, a piezo-electricity motor, or a piezoelectric transducer.

7. A projector comprising:

a light source unit;

a light polarizing module configured for receiving light from the light source unit;

a color light separation optical module configured for receiving light from the light polarizing module;

a reflection mirror group configured for receiving light from the color light separation optical module;

a liquid crystal panel group configured for receiving light from the reflection mirror group, the liquid crystal panel group including at least three liquid crystal panels, each of the liquid crystal panels having a mounting frame and a liquid crystal lens attached to the mounting frame;

a cross dichroic prism configured for receiving light from the liquid crystal panel group;

a projection lens configured for receiving light from the cross dichroic prism; and at least an automatic dust-removing device configured for removing dust from the liquid crystal panel group, the at least one automatic dust-removing device being attached to at least one side of the mounting frame, the automatic dust-removing device having a fastening element, at least one vibration element and an optical lens, the fastening element being attached to the mounting frame, the at least one vibration element and the optical lens being attached to the fastening element, the fastening element comprising at least two sidewalls and at least one handle mounted on each of the at least two sidewalls, the at least two sidewalls being attached to the mounting frame, the at least one vibration element received in one of the at least two handles, the two handles each defining at least one receiving hole for receiving the at least one vibration element therein.

8. The projector of claim 7, wherein the color light separation optical module comprises a first dichroic mirror and a second dichroic mirror, the reflection mirror group including a first reflection mirror, a second reflection mirror and a third reflection mirror, the first reflection mirror reflecting red light transmitting through the first dichroic mirror toward a first liquid crystal panel of the liquid crystal panel group, the second dichroic mirror reflecting green light toward a second liquid crystal panel of the liquid crystal panel group, the second and the third reflection mirror reflecting blue light transmitting through the second dichroic mirror toward a third liquid crystal panel of the liquid crystal panel group.

9. The projector of claim 8, wherein the mounting frame comprises a main body and a receiving cavity defined in the main body, the liquid crystal lens being received in the receiving cavity of the mounting frame.

10. The projector of claim 7, wherein the fastening element has an indent defined between at least two sidewalls, a supporting surface being from at a bottom of the indent, the optical lens being received in the indent of the fastening element and being disposed on the supporting surface.

11. The projector of claim 7, wherein each of the at least an automatic dust-removing device comprises an adhesive element for adhering the optical lens to the fastening element.

12. The projector of claim 7, wherein each of the at least an automatic dust-removing device comprises an urging element, the urging element comprising at least two urging strips, the at least two urging strips being attached to the fastening element and generating forces exerted toward edges of the optical lens.

13. The projector of claim 7, wherein the at least a vibration element is selected from a vibration motor, a piezoelectricity motor, or a piezoelectric transducer.

* * * * *